US007809654B2

(12) United States Patent
Blanluet et al.

(10) Patent No.: US 7,809,654 B2
(45) Date of Patent: Oct. 5, 2010

(54) UNIVERSAL MODULAR MAIL HANDLING SYSTEM

(75) Inventors: Patrick Blanluet, Paris (FR); Thierry Le Jaoudour, Verrieres le Buisson (FR)

(73) Assignee: Neopost Industrie, Bagneux (FR)

( * ) Notice: Subject to any disclaimer, the term of this patent is extended or adjusted under 35 U.S.C. 154(b) by 805 days.

(21) Appl. No.: 10/230,997

(22) Filed: Aug. 30, 2002

(65) Prior Publication Data

US 2003/0061177 A1 Mar. 27, 2003

(30) Foreign Application Priority Data

Aug. 31, 2001 (FR) .................................. 01 11301

(51) Int. Cl.
*G06F 17/00* (2006.01)

(52) U.S. Cl. ...................................................... 705/401

(58) Field of Classification Search ....................... None
See application file for complete search history.

(56) References Cited

U.S. PATENT DOCUMENTS

| | | | | |
|---|---|---|---|---|
| 3,583,314 | A * | 6/1971 | Gillender et al. | 101/91 |
| 4,752,950 | A | 6/1988 | Le Carpentier | |
| 4,802,218 | A * | 1/1989 | Wright et al. | 705/60 |
| 5,321,436 | A * | 6/1994 | Herbert | 347/19 |
| 5,731,980 | A * | 3/1998 | Dolan et al. | 705/410 |
| 5,809,485 | A * | 9/1998 | Arsenault et al. | 705/410 |
| 5,850,442 | A * | 12/1998 | Muftic | 705/65 |
| 6,035,291 | A | 3/2000 | Thiel | |
| 6,341,274 | B1 * | 1/2002 | Leon | 705/410 |
| 2001/0042055 | A1 * | 11/2001 | Didriksen et al. | 705/407 |
| 2002/0183890 | A1 * | 12/2002 | Bass et al. | 700/213 |
| 2003/0078893 | A1 * | 4/2003 | Shah et al. | 705/60 |
| 2005/0038758 | A1 * | 2/2005 | Hilbush et al. | 705/402 |

FOREIGN PATENT DOCUMENTS

| | | | |
|---|---|---|---|
| EP | 0376574 | * | 12/1989 |
| EP | 0 376 574 | A2 | 7/1990 |
| EP | 0376574 | * | 7/1990 |
| EP | 0 721 173 | A2 | 7/1996 |

OTHER PUBLICATIONS

Haartsen, Jaap, "Bluetooth—The universal radio interface for ad hoc, wireless connectivity", Ericsson Review, No. 3, pp. 110-117, 1998.*
Haartsen, Jaap, "Bluetooth—The universal radio interface for *ad hoc*, wireless connectivity", Ericsson Review, No. 3, pp. 110-117, 1998.

* cited by examiner

*Primary Examiner*—John W Hayes
*Assistant Examiner*—Rob Wu
(74) *Attorney, Agent, or Firm*—Sughrue Mion, PLLC

(57) ABSTRACT

This invention relates to a mail handling system intended for printing postal indicia on a mail item, comprising a franked label dispenser allowing the print of postal indicia on a label intended thereafter to be stuck on the mail item, and a control computer terminal intended to remotely control print of the postal indicia on the label. It also preferably comprises electronic scales for previously determining the weight of the mail items having then to be printed, control of these scales being effected remotely from the control computer terminal and the remote control from the computer terminal is advantageously effected by short distance radio link, preferably of the Bluetooth or like type.

3 Claims, 3 Drawing Sheets

UNIVERSAL MODULAR MAIL HANDLING SYSTEM

FIELD OF THE INVENTION

The present invention concerns the exclusive domain of mail handling and relates to a particularly modular mail handling system.

BACKGROUND OF THE INVENTION

Conventional franking machines intended for franking mail items are well known. In addition to their ability to frank standard mail items, they generally comprise a reloadable label dispenser (the band or tape bearing the labels is a consumable) which allows a print on a label instead of a direct print on the mail item. Unwinding of the tape of labels is most often controlled, through kinematics employing gears, pulleys and belts for example, by the motor of the franking machine. Such printing on labels thus allows packets, parcels, rolls or bulky envelopes to be franked which, due to their dimensions, could not pass through a conventional franking machine.

Furthermore, Applicants' product known under the Registered Trademark “simply postage” is known, consisting of a miniature label franking machine incorporating scales, which is used in cooperation with a standard computer (of personal computer type) linked to a server of the franking machine distributor through a telecommunication system.

At the present time, when it is desired to frank bulky envelopes or parcels, one must either have available a conventional franking machine provided with a label dispenser and to which electronic scales must be connected (although such scales may also be directly integrated in the franking machine), the whole being controlled at the level of a user interface of the franking machine, or one can employ the solution mentioned above, the connected miniature machine. However, these two solutions, which both give satisfaction, are still expensive and not very versatile. In effect, the integration of a label dispenser (in the conventional machine) or of electronic scales (in a miniature machine) increases the cost of such machines. Moreover, the reduced user interface of the miniature machine proves to be unsuitable when large quantities of envelopes of standard format and thickness are to be franked.

There is therefore a need at the present time for a universal mail handling system of low cost, more modular and guaranteeing a greater versatility, particularly in the handling of mail of non-standard format.

It is therefore an object of the present invention to provide such a modular mail handling system, each module being of simple design and easily integrated in the system. Another purpose of the invention is to propose a franked label dispenser forming part of this modular mail handling system.

SUMMARY OF THE INVENTION

These objects are attained by a mail handling system intended for printing postal indicia on a mail item, characterized in that it comprises:

- a franked label dispenser allowing the print of postal indicia on a label intended thereafter to be stuck on the mail item,
- a control computer terminal intended to remotely control the print of the postal indicia on the label.

The remote control of the dispenser renders the user interface more convivial and more developed, allowing more functionalities, in particular controls of other franking devices.

This system may also comprise a franking machine for printing postal indicia on standard mail items, the control of print being effected remotely, from the control computer terminal, as well as electronic scales to determine beforehand the weight of the mail items having then to be printed, the control of these scales likewise being effected remotely, from the control computer terminal.

Advantageously, it also comprises a standard printer for printing receipts or acknowledgements of receipt, the control of print being effected remotely from the control computer terminal.

According to a preferred embodiment, the remote control from the computer terminal is effected by short distance radio link, preferably of Bluetooth or like type. In this configuration, it preferably comprises, in that case, a base radio station module linked to a telecommunication network to place the control terminal in communication with a distant server through this telecommunication network.

The franking machine and the dispenser of franked labels preferably comprise accounting means in the form of a removable standardized module that may be disposed equally well in one or the other franking device, this standardized accounting module being able to integrate said short distance radio interface.

BRIEF DESCRIPTION OF THE DRAWINGS

The invention will be more readily understood on reading the following description given by way of non-limiting example, with reference to the accompanying drawings, in which.

DESCRIPTION OF PREFERRED EMBODIMENT

Figure 1:
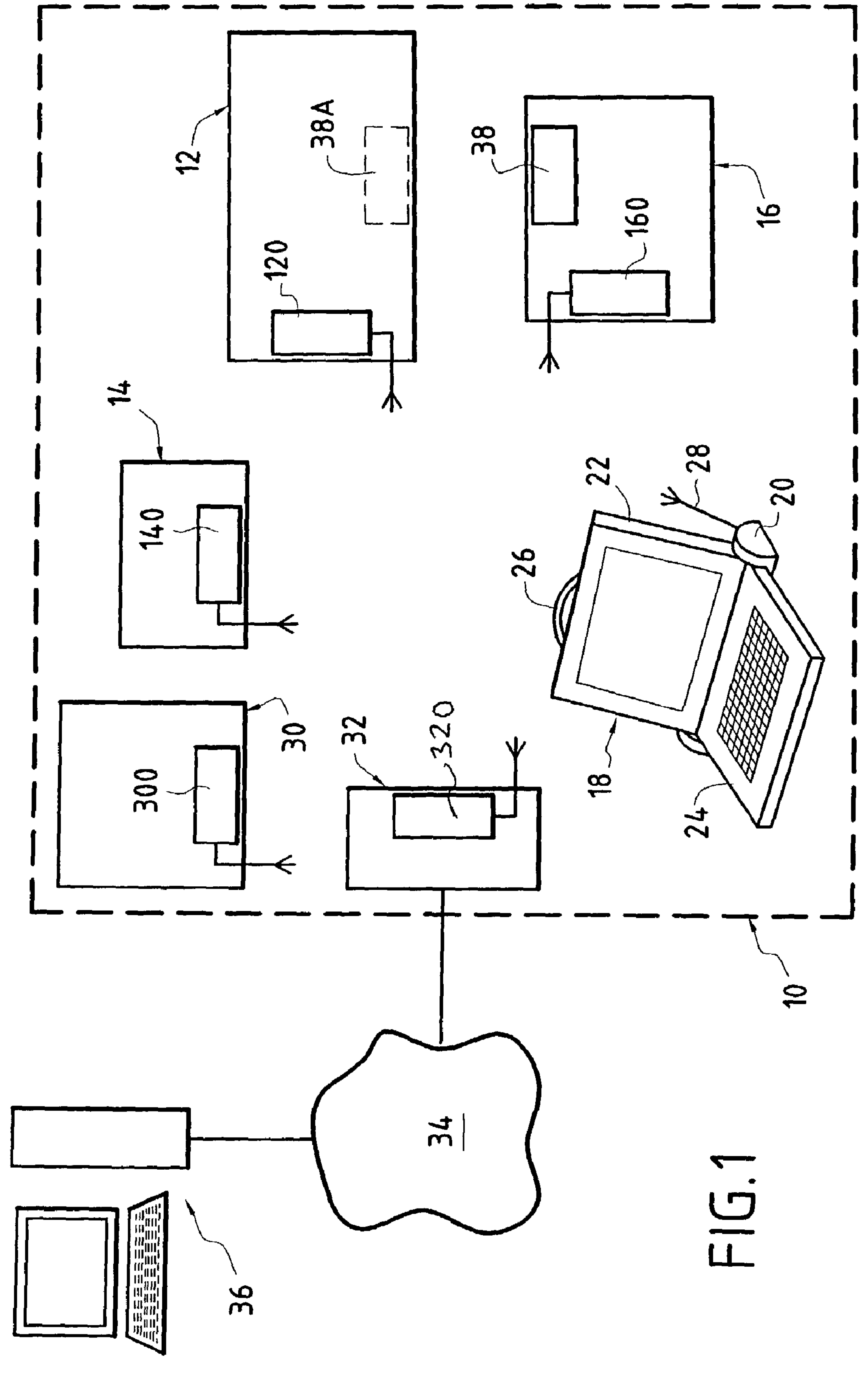
FIG. 1 schematically shows a universal mail handling system according to the invention comprising, in particular, a franked label dispenser.

Referring now to the drawings, FIG. 1 shows a mail handling system intended to be employed in a mail dispatch department 10 of an enterprise or an administration, and qualified as “universal” due to its particular modularity.

This system is organized around independent modules, each performing a unique specific function and therefore each able to benefit from a very simple concept. It firstly comprises a franking machine 12 reduced to the sole function of franking standard mail items, to the exclusion of any other function of printing labels or weighing the mail items usually present in a conventional machine. This particularly simple franking machine therefore comprises only means for feeding mail items, means for conveying these mail items and means for printing postal indicia on these mail items. Therefore it does not present any label dispenser or any weighing module. Neither does it present a developed user interface (traditional keyboard plus screen for example), the control of its functions being effected from the outside, as will be explained in greater detail.

This universal system then comprises electronic scales 14 intended to cooperate with the franking machine 12 by determining the weight of each of the standard mail items having to be franked by this machine. However, these scales are also intended to cooperate with a franked label dispenser 16 which delivers labels bearing postal indicia for non-standard mail items (packets, parcels, rolls, thick envelopes). This dispenser is also of particularly simple structure, with label feed means in tape form, means for driving this tape and means for printing postal indicia on a delivered part of the tape. Therefore it does not present a weighing module or a developed user interface. Like the preceding franking machine, its functions are controlled from the outside.

In order to ensure processing of the mail, i.e. to control weighing of a mail item by the scales 14 and print it by the franking machine 12 or order the print of a label by the franked label dispenser 16, this universal system further comprises a control computer terminal 18, outside the preceding modules, and from which all the weighing and printing operations are managed. This terminal presents a particularly simple material architecture with a central processing unit 20 associated with a screen 22 and a keyboard 24. The keyboard may advantageously be folded against the screen and the whole is transportable by a handle 26 integral therewith.

Figure 2:
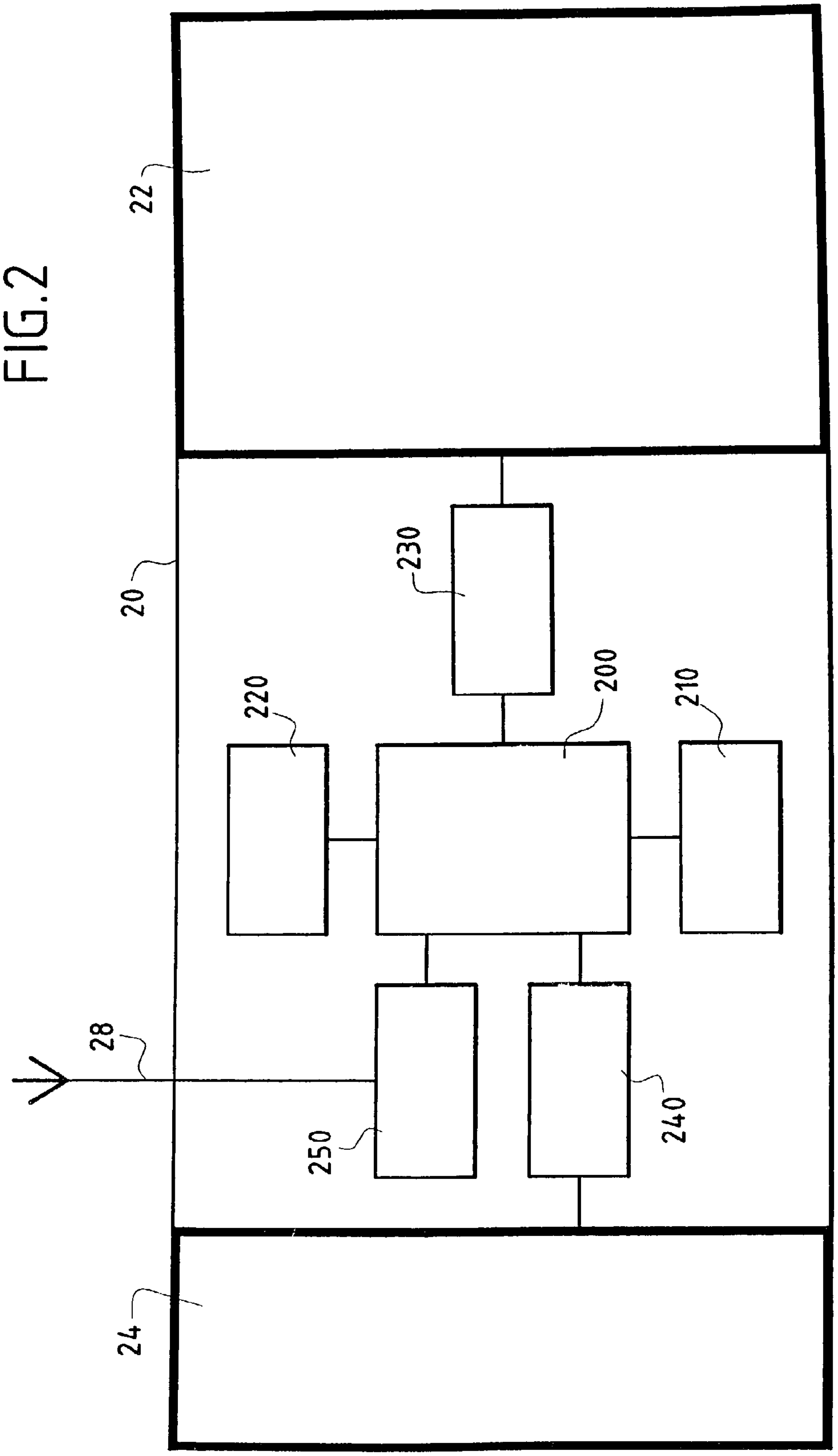
FIG. 2 illustrates the internal structure of a computer terminal for controlling the universal mail handling system of FIG. 1, and FIGS. 3 and 4 respectively are views in outside perspective and in longitudinal section of the franked label dispenser of FIG. 1.

As shown in FIG. 2, the central processing unit is reduced to some interconnected standard components: a microprocessor 200, a RAM memory 210, a Flash memory 220, a screen interface 230, a keyboard interface 240 and a radio interface 250. The Flash memory contains the operating system necessary for managing the terminal, particularly its user interface which ensures the control of weighing by the electronic scales 14, of print by the franking machine 12 or the franked label dispenser 16, and of its communication links with these three modules. The different data useful for these controls and communications are temporarily stored in the RAM memory. The radio interface is advantageously an interface making it possible to manage short distance radio links of Bluetooth type, or the like (for example in accordance with standard IEEE802-11b), emitted or received by an antenna 28 mounted on the central unit (another material arrangement, along the screen for example, may also be envisaged). Of course, in order to ensure these radio links between modules, the scales, the franking machine and the franked label dispenser are each provided with a similar radio interface 120, 140, 160 also provided with an emission/reception antenna.

In its most simple configuration, the universal modular mail handling system according to the invention may be formed simply by the control terminal 18 and the franked label dispenser 16, the labels supplied by such a dispenser being, of course, also able to frank standard envelopes.

In a more developed configuration, it may also integrate a standard printer 30 provided with means 300 for radio link with the other modules for the print, in particular, of receipts or acknowledgements of receipt corresponding to the different weighings or frankings effected, and a base module 32 comprising radio means 320 allowing a short distance radio link with each of the modules, including the control computer terminal 18, and linked to an outside telecommunication network 34 of RTC, RNIS or cable type to ensure a communication link with a remote server 36, Postal Service server or server of the mail handling system distributor. This link allows in particular statistics relative to the print of the postal indicia to be transmitted towards the server, or the accounting means of the franking machine or the franked label dispenser to be reloaded.

According to a particular embodiment, these accounting means 38 are removable, standardized and common to the franking machine 12 and to the franked label dispenser 16 and may disposed equally well in one or the other of these two modules (for example in the franked label dispenser as illustrated in FIG. 1, the zone 38A in dotted lines corresponding to the location of these accounting means in the franking machine which, in that case, does not present one). The user, although having two postal indicia print means available, is holder of only one account, which particularly facilitates management of the system. In addition, the standardization of these accounting means allows them to be used in any other franking device of the user's enterprise (or of an outside service enterprise for example), these means no longer being linked to a given machine but to a given user. When the link between these different modules is effected by radio, it may be advantageous if this standardized accounting module directly integrates the short distance radio interface and its emission/reception antenna.

Figure 3:
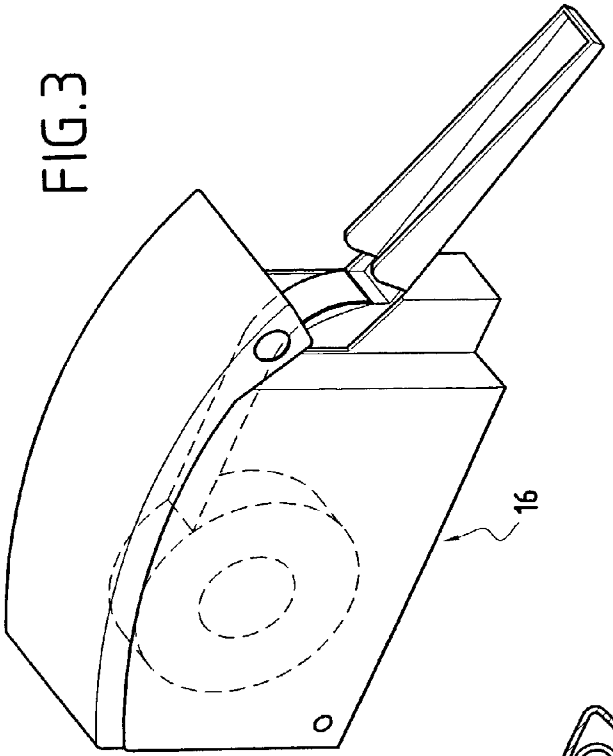
Figure 4:
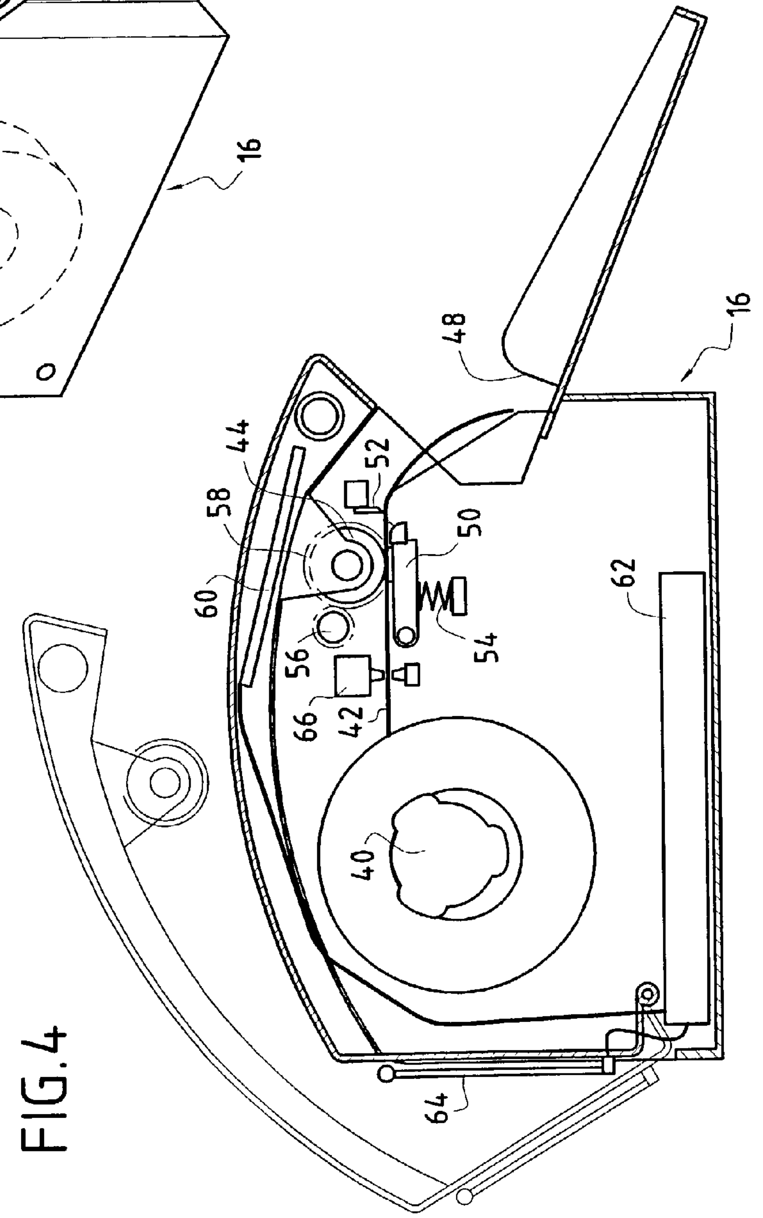

FIGS. 3 and 4 respectively show in outside perspective and schematically in longitudinal section, a franked label dispenser 16 intended to integrate the universal mail handling system described hereinabove.

This dispenser comprises an idly mounted roller 40 on which is wound a continuous tape 42 of labels to be cut out (or pre-cutout ones), at least one drive roller 44 for delivering this tape along a conveyor path of this dispenser from this roller up to an exit 48 of franked labels, a print module 50 of thermal type for printing postal indicia on a delivered part of this tape, and possibly a cutting module 52 (in the case of labels to be cut out) placed on this conveyor path, advantageously at the exit of the print module 50.

The drive roller 44 of capstan type which ensures unwinding of the tape of labels, by acting on the print module against a spring 54, is actuated by a control micromotor 56 through kinematics 58 incorporating toothed wheels. The print module and the micromotor for controlling the capstan which is actuated in synchronism with the print (and possibly the cutting module if there is one), are supplied from means 60 for drive, feed and control of the heating elements of the thermal module managed from processing means 62 (advantageously incorporating a microprocessor). These processing means conventionally integrate accounting means to keep account (management of the ascending and descending registers in particular) of the frankings effected. However, as explained hereinbefore, these accounting means may be removable and standardized (reference 38 in FIG. 1) so as to be able to be disposed equally well in this dispenser or in any other franking device. In that case, they are advantageously connected with the processing means by a conventional computer connection of backplane type. The processing means also comprise means for remote communication with the control computer terminal 18 to receive the orders to print the postal indicia. Such remote communication with the control computer terminal is preferably effected by short distance radio link, of Bluetooth or like type, via a radio interface provided with an emission/reception antenna 64. However, any other type of wireless link, infrared for example, or even of wire link, optical for example, may, of course, also be envisaged insofar as the other equipment, and in particular the control computer terminal, is provided with the corresponding interfaces.

Finally, an end of tape detector 66 is provided to allow unwinding of the continuous tape to be precisely monitored and to avoid partial print of the last postal indicia.

What is claimed is:

1. A mail handling system for printing postal indicia on a mail item, comprising:

A reduced franking machine for printing postal indicia on a standard mail item, said reduced franking machine including a first removable accounting module, said reduced franking machine being void of a user interface for controlling said reduced franking machine;

A franked label dispenser for printing postal indicia on a label having thereafter to be stuck on the mail item, the franked label dispenser comprising a second removable accounting module, print means for printing postal indicia on said label, and processing means for controlling said print means for printing postal indicia; and A transportable control computer terminal, remote from the reduced franking machine and the franked label dispenser, for remotely controlling both the reduced franking machine and the franked label dispenser for printing the postal indicia on at least one of (1) the standard mail using the reduced franking machine and (2) the label using the franked label dispenser, via a short radio interface, Wherein the first removable accounting module is interchangeable with the second removable accounting module, such that the second removable accounting module is usable in place of the first removable accounting module in the reduced franking machine and the first removable accounting module is usable in place of the second removable accounting module in the franked label dispenser, and Wherein the reduced franking machine and the franked label dispenser are separate modules communicable with the transportable control computer terminal via short distance radio links.

2. A mail handling system for printing postal indicia on a mail item, comprising:

A reduced franking machine for printing postal indicia on a standard mail item, said reduced franking machine including a first removable accounting module, said reduced franking machine being void of a user interface for controlling said reduced franking machine;

A franked label dispenser for printing postal indicia on a label having thereafter to be stuck on the mail item, the franked label dispenser comprising a second removable accounting module, print means for printing postal indicia on said label, and processing means for controlling said print means for printing postal indicia;

A transportable control computer terminal, remote from the reduced franking machine and the franked label dispenser, for remotely controlling both the reduced franking machine and the franked label dispenser for printing the postal indicia on at least one of (1) the standard mail using the reduced franking machine and (2) the label using the franked label dispenser; and Means for remotely and wirelessly communicating the computer terminal with the processing means of the franked label dispenser, Wherein the first removable accounting module is interchangeable with the second removable accounting module, such that the second removable accounting module is usable in place of the first removable accounting module in the reduced franking machine and the first removable accounting module is usable in place of the second removable accounting module in the franked label dispenser, and Wherein the reduced franking machine and the franked label dispenser are separate modules communicable with the transportable control computer terminal via short distance radio links.

3. A mail handling system for printing postal indicia on a mail item, comprising:

A reduced franking machine for printing postal indicia on a standard mail item, said reduced franking machine including a first removable accounting module, said reduced franking machine being void of a user interface for controlling said reduced franking machine;

A franked label dispenser for printing postal indicia on a label having thereafter to be stuck on the mail item, said franked label dispenser including a second removable accounting module; and A control computer terminal for controlling both the reduced franking machine and the franked label dispenser for printing the postal indicia on at least one of (1) the standard mail using the reduced franking machine and (2) the label using the franked label dispenser, via a short radio interface, said computer terminal being remote from said reduced franking machine and said franked label dispenser, Wherein the first removable accounting module is interchangeable with the second removable accounting module, such that the second removable accounting module is usable in place of the first removable accounting module in the reduced franking machine and the first removable accounting module is usable in place of the second removable accounting module in the franked label dispenser, and Wherein the reduced franking machine and the franked label dispenser are separate modules communicable with the control computer terminal via short distance radio links.

* * * * *